(12) United States Patent
Kayanuma

(10) Patent No.: US 6,341,109 B1
(45) Date of Patent: Jan. 22, 2002

(54) DEFECTIVE AREA REPLACEMENT METHOD AND INFORMATION WRITING/READING DEVICE

(75) Inventor: Kinji Kayanuma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/497,410

(22) Filed: Feb. 3, 2000

(30) Foreign Application Priority Data

Feb. 5, 1999 (JP) .......................................... 11-028959

(51) Int. Cl.$^7$ ................................................ G11B 7/00
(52) U.S. Cl. ................................. 369/47.14; 369/53.17
(58) Field of Search ........................ 360/48; 369/47.14, 369/47.15, 47.16, 47.17, 53.15–53.17; 714/710, 719, 8

(56) References Cited

U.S. PATENT DOCUMENTS

| | | | | |
|---|---|---|---|---|
| 5,963,522 A | * | 10/1999 | Yamamuro | |
| 5,978,336 A | * | 11/1999 | Mine et al. | |
| 6,118,608 A | * | 9/2000 | Kakihara et al. | |
| 6,205,099 B1 | * | 3/2001 | Sasaki et al. | |
| 6,272,085 B1 | * | 8/2001 | Maeda | 369/53.17 |

FOREIGN PATENT DOCUMENTS

| | | |
|---|---|---|
| JP | 2-39365 | 3/1990 |
| JP | 2-87370 | 3/1990 |
| JP | 5120808 | 5/1993 |
| JP | 6-150558 | 5/1994 |
| JP | 8-138323 | 5/1996 |
| JP | 8289248 | 11/1996 |
| JP | 963202 | 3/1997 |
| JP | 9282802 | 10/1997 |

* cited by examiner

Primary Examiner—W. R. Young
Assistant Examiner—Dzung C. Nguyen
(74) Attorney, Agent, or Firm—Young & Thompson

(57) ABSTRACT

A method of replacement processing for secondary defects is provided that can maintain both the transfer rate and quality of write/read data at high levels. According to the method, a change-permitted range in which changes in the assignment of logical addresses is allowed is acquired, and when sectors having secondary defects due to write abnormalities are detected, replacement of sectors is carried out as long as changes in the assignment of logical addresses do not go beyond sectors in the change-permitted range by: omitting the secondary defect sectors by additionally registering the defective sectors in a slip replacement list, and shifting back the assignment of logical addresses as long as there are free sectors following the abnormal sectors.

6 Claims, 14 Drawing Sheets

Fig. 15

| |
|---|
| NUMBER OF TIMES OF REPLACEMENT LIST UPDATING |
| SLIP REPLACEMENT LIST IDENTIFICATION NUMBER |
| NUMBER OF SLIP REPLACEMENT DEFECTS REGISTERED IN THE LIST |
| PHYSICAL ADDRESS OF FIRST DEFECTIVE SECTOR |
| PHYSICAL ADDRESS OF SECOND DEFECTIVE SECTOR |
| ■<br>■<br>■ |
| PHYSICAL ADDRESS OF LAST DEFECTIVE SECTOR |
| LINEAR REPLACEMENT LIST IDENTIFICATION NUMBER |
| NUMBER OF LINEAR REPLACEMENT DEFECT REGISTERED IN THE LIST |
| FIRST REPLACEMENT ORIGIN PHYSICAL ADDRESS |
| FIRST RPLACEMENT DESTINATION PHYSICAL ADDRESS |
| SECOND REPLACEMENT ORIGIN PHYSICAL ADDRESS |
| SECOND REPLACEMENT DESTINATION PHYSICAL ADDRESS |
| ■<br>■<br>■ |
| LAST REPLACEMENT ORIGIN PHYSICAL ADDRESS |
| LAST REPLACEMENT DESTINATION PHYSICAL ADDRESS |
| NUMBER OF TIMES OF REPLACEMENT LIST UPDATING |

DEFECTIVE AREA REPLACEMENT METHOD AND INFORMATION WRITING/READING DEVICE

BACKGROUND OF THE INVENTION

1. Field of the Invention

The present invention relates to a method for replacing defective areas and to an information writing/reading device having the functions for executing replacement, and particularly to a defective area replacement method and information writing/reading device capable of maintaining both the transfer rate and reliability of data.

2. Description of the Related Art

An information writing/reading device of the prior art is first described with reference to the accompanying figures. Recording medium 9 shown in FIG. 1 is, for example, an optical disk medium with tracks that are cut in accordance with spiral or concentric guide grooves, the writing marks of the tracks being formed according to the intensity of a condensed laser beam that is irradiated upon the recording medium by head 8. As shown in FIG. 2, the tracks formed on recording medium 9 are in turn formed from header portions in which physical address data are written at fixed intervals to indicate locations on tracks, and data portions used for writing data. A sector is constituted by an area made up by a header portion paired with a data portion. Physical addresses are assigned without duplication to all sectors on a track.

Sectors on the recording medium are further divided into a plurality of areas by physical addresses.

FIG. 3 is a schematic view showing one example of the format of a recording medium. A lead-in area made up of a plurality of sectors is provided at the start of a track, and a lead-out area made up of a plurality of sectors is also provided at the end of a track. The lead-in area. and lead-out area are not used for writing and reading data, and only physical addresses are written in these areas. Detection of these physical addresses allows determination of whether the relevant area is not to be subject to writing/reading. Defect management areas are provided in two locations: just inside the lead-in area and lead-out areas. A plurality of user areas and spare areas are provided inside these two areas. Spare areas are provided at the end of zones that are partitioned according to, for example, the number of sectors contained in one rotation of the disk, and the proportion of spare areas is approximately 0.5% that of the user areas.

Information relating to defective sectors in the user areas and spare areas is recorded in defect management areas, defect management areas being provided in at least two locations. In this way, despite the occurrence of a defective sector in the sectors of one defect managing area, the other defect management area can provide back-up so that information relating to defective sectors in the user areas and spare areas is not lost. Recording identical information in a plurality of areas allows use of defect management information as long as reading of any set of information is successful.

The information written in a defect management area is made up by a slip replacement list and a linear replacement list. Defective sectors are indicated using the type of format shown in FIG. 4, which shows one example of the write format in a defect management list.

The physical addresses of defective sectors that were extracted in the certification process are written in the slip replacement management list shown in this figure. In order from the beginning, the list includes: a slip replacement list identification number, which indicates that the content of the list is a slip replacement list; the number of slip replacement defects registered in the list; and the physical addresses of defective sectors. A buffer area is provided at the end of the slip replacement list so that the length of the list can be kept uniform regardless of the number of defects registered.

The linear replacement list is written after the slip replacement list. The linear replacement list is used for replacement of sectors having secondary defects not detected during certification. In order from the beginning, the list includes: a linear replacement list identification number indicating that the content of the list is a linear replacement list; the number of list updates; and the number of linear replacement defects registered in the list, following which a number of replacement origin physical addresses, each paired with a replacement destination physical address, are written, the number of these pairs being equal to the number of registered defects. Finally, the number of list updates is again recorded at the end. The linear replacement list portion of the data recorded in the defect management area can be rewritten. The number of updates is recorded in two locations, i.e, close to the beginning and at the end of the linear replacement list, to allow verification that the list has been correctly updated. A discrepancy between these two numbers allows determination of the possibility of an interruption in writing when the list was updated.

Returning now to FIG. 1, the flow of processes in an information writing/reading device is next explained. At the time of starting up information writing/reading device 10, CPU 1 instructs head position control circuit 6 to read the defect management areas of recording medium 9. Head 8 moves to a defect management area under the control of head position control circuit 6 and outputs the read signals. The read signals output from head 8 are sent as data of the defect management area to disk control circuit 4 by way of write/read signal processing circuit 7 and format control circuit 3. Disk control circuit 4 stores the data of the defect management area in buffer memory 5. The data of the defect management area that is temporarily stored in buffer memory 5 is further read from buffer memory 5 by disk control circuit 4 and transferred to the slip replacement list storage section and linear replacement list storage section of memory 2.

The replacement of defective areas in the write/read operations of recording medium 9 is executed based on the information that is in the slip replacement list storage section and linear replacement list storage section in memory 2.

A write request from host device 11 is sent to disk control circuit 4 along with logical addresses indicating the write locations. Disk control circuit 4 reports to CPU 1 that a write request from host device 11 has been generated. CPU 1 receives the content of the request from disk control circuit 4 and instructs disk control circuit 4 to transfer data from host device 11 to buffer memory 5. The data to be written are thus taken from host device 11 by disk control circuit 4 and temporarily stored in buffer memory 5.

In CPU 1, the physical addresses on recording medium 9 are calculated from the logical addresses of the data to be written, and a write request of the data that are to be written to the calculated physical addresses is sent to head position control circuit 6 and format control circuit 3.

FIG. 5 is a block diagram that focuses on, of the functions of CPU 1, memory 2, and format control circuit 3 in information writing/reading device 10, the functions that are related to replacement processing and address conversion processing.

In FIG. 5, address converting means 103 provided in CPU 1 is equipped with functions for calculating the physical addresses of recording medium 9 that correspond to the logical addresses of the data to be written using the information of slip replacement list storage section 202 and linear replacement list storage section 203 that are provided in memory 2.

Head 8 moves in the direction of the physical addresses of recording medium 9 based on the control of head position control circuit 6 and in addition, outputs address signals read from recording medium 9. The address signals are sent to format control circuit 3 by way of write/read signal processing circuit 7. Upon detecting the physical addresses designated by CPU 1, format control circuit 3 receives the data to be written from buffer memory 5 by way of disk control circuit 4, and sends the data to be written to write/read signal processing circuit 7. Write/read signal processing circuit 7 processes the data to be written to data of a waveform suitable for writing and carries out operations for writing the data onto recording medium 9 through head 8.

The details regarding the operation of calculating the physical addresses from logical addresses are next explained.

FIG. 6 is a schematic view showing the assignment of replacement sectors provided for explaining the method of replacing defective areas according to the prior art. FIG. 6 shows a case in which eight sectors are provided for the user areas and four sectors are provided for the spare areas. In actuality, the proportion of spare areas to user areas is on the order of 5%, with 500 sectors of spare areas usually being provided for 100,000 sectors of user areas. If there are no defective sectors, the logical addresses match physical addresses wherein addresses are assigned in an ascending order to the sectors of user areas. The number of slip replacement sectors contained in one user area is established to be equal to or less than the number of spare area sectors that follow that user area. If physical addresses that are registered in the slip replacement list are contained in user areas or in spare areas, the sectors of these addresses are regarded as defective sectors and excluded, and logical addresses are assigned to the remaining physical addresses in ascending order.

If the sectors having physical addresses "3" and "5" are defective sectors that are registered in the slip replacement list, for example, logical addresses are assigned while avoiding these defective sectors, whereby logical address "3" corresponds to physical address "4", and logical addresses "4" to "7" correspond to physical addresses "6" to "9". The sectors having the logical addresses "8" and on corresponding to the next user area, however, are not influenced by the number of slip replacement sectors of the preceding user area, and the physical addresses to which logical addresses are assigned are determined by defects in user areas following physical address "12". In other words, the number of slip replacement sectors of a user area is limited by the number of sectors of the spare area.

If defective sectors are registered in the linear replacement list, verification is carried out to determine whether or not physical addresses that were assigned to logical addresses through calculations using the slip replacement list have been registered in the linear replacement list as replacement origin physical addresses. If such an address is registered, the physical address of the replacement origin is replaced by the physical address of the replacement destination. For example, if the physical address "8" is registered in the replacement origin sector and physical address "10" is registered in the linear alteration destination sector of the linear replacement list, the sector that corresponds to logical address "6" is the sector of physical address "10" rather than physical address "8" that was calculated using the slip replacement list. The sector that corresponds to logical address "7" is simply the sector of physical address "9".

When writing digital data to a recording medium, the replacement process is carried out with respect to sectors in which writing abnormalities occur to maintain the reliability of data. Physical address information is written to the recording medium in the case of recording media such as optical disks and magnetic disks. Data cannot be written to a physical address if the physical address of the data to be written cannot be detected, and the physical address is handled as a writing abnormality. Verification in which data are read after writing allows detection of sectors having writing abnormalities in the data portion and further increases reliability.

If a writing abnormality is detected in a sector, this sector is judged to be a defective sector and the replacement process is executed using a spare area that has been provided in advance. Generally, slip replacement is used for primary defects that originate in the fabrication of the disk, and linear replacement is used for secondary defects.

In slip replacement, logical addresses are made to correspond in an ascending order to physical addresses, which are assigned to each sector, while omitting defective sectors. In slip replacement, drops in transfer speed due to the occurrence of seeking can be prevented because the order of logical addresses on the recording medium is maintained. If slip replacement is carried out for secondary defects, however, the assignment of logical addresses to physical addresses will shift at and after addresses at which a substitute sector was added for a defective sector. If there are sectors in which data have already been written and the assignment of logical addresses to these physical addresses changes, the problem arises that the content of these sectors no longer correctly corresponds to the logical addresses. Slip replacement is therefore used only for primary defects that are detected in the certification process.

The occurrence of a secondary defect calls for the use of linear replacement, in which a replacement destination for a defective sector is reserved in a spare area. As shown in FIG. 5, a sector in which a writing abnormality has occurred is detected by abnormality detecting means 301 provided in format control circuit 3. For a sector in which the occurrence of a write abnormality has been detected, replacement destination reserving means 105, which is provided CPU 1, reserves from a free sector in a spare area a replacement destination for the defective sector in which the writing abnormality occurred. Normally, replacement destination sectors are assigned in order starting from sectors of spare areas that are close to the defective sector and that have logical addresses that have not yet been assigned. Linear replacement list updating means 104 provided in CPU 1 additionally registers the physical address of a newly detected defective sector and the physical address of a replacement destination sector to linear replacement list storage section 203 provided in memory 2. Address converting means 103 refers to the information of slip replacement list storage section 202 and the information of linear replacement list storage section 203 that has been updated, assigns a physical address to a logical address, and in this way the writing process is continued to the assigned physical address and linear replacement is realized.

Turning now to the flow chart of FIG. 7, the replacement process of the prior art is described in detail for a case in which a secondary defect occurs.

As shown in FIG. 7, when writing data, the logical address of the data to be written is first acquired from host device 11 (Step B1). The acquired logical address of the data to be written is next converted to a physical address (Step B2). The writing of the data to the obtained physical address is next executed (Step B3), and verification is carried out to determine whether or not writing was carried out normally (Step B4). The occurrence of an abnormality in writing can be recognized if the physical address on the disk could not be verified or if data could not be read from the written area (Step B4 "No"). Here, if writing was carried out normally (Step B4 "Yes"), host device 11 is notified that writing has been completed (Step B5) and the series of data writing operations ends. On the other hand, if a writing abnormality is recognized in Step B4 (Step B4 "No"), the physical address of the defective sector is added to the linear replacement list as a replacement origin address and a still unused sector is selected from spare areas and registered as the replacement destination address (Step B6). In the interest of shortening the distance of movement of the head, a sector that is close to the physical address of the replacement origin is usually selected as the replacement destination.

However, linear replacement, in which only defective sectors are substituted by replacement destination sectors in spare areas entails a marked increase in processing time over that of slip replacement, in which logical addresses are only shifted back, due to the secondary processing that accompanies head movement.

Replacement for secondary defects is necessary to maintain the quality of write/read data. If secondary defects are ignored, data that are written to these areas are lost.

When using linear replacement, however, it is difficult to always reserve a replacement destination sector at a location that is physically close to the defective sector which is the replacement origin. The frequency of increases in processing time brought about by movement of the head therefore rises, and real-time processing becomes difficult to ensure.

In particular, if the written data are moving image information or speech information in which real time characteristics are demanded, deviation in the timing of writing and reading has the same effect as the occurrence of an error. If replacement of data is not carried out, however, the probability of errors in the read data increases, and reading is adversely affected.

SUMMARY OF THE INVENTION

It is an object of the present invention to provide a method, as well as an information writing/reading device, for replacing secondary defect areas that can maintain both the quality and transfer rate of write/read data at high levels.

To solve the problems of the prior art, the method of replacing defective areas according to the present invention uses not linear replacement but slip replacement for processing secondary defects in cases in which the execution of slip replacement has no effect on the assignment of logical addresses outside a change-permitted range. In more concrete terms, a change-premitted range that extends from the sector in which writing or reading instructed by a host device is to be carried out and as far as the next used area is collectively acquired; and when an abnormality is detected in a write destination sector when writing data, if there is a spare area in the change-permitted range following that secondary defect sector, and moreover, if there is a free sector in the spare area, the assignment of sectors is replaced by additionally registering the physical addresses of the secondary defect sectors in the slip replacement list to omit the secondary defect sector and shifting back the assignment of logical addresses in the range that contains free sectors after the secondary defect sector.

The above and other objects, features, and advantages of the present invention will become apparent from the following description based on the accompanying drawings which illustrate an example of a preferred embodiment of the present invention.

BRIEF DESCRIPTION OF THE DRAWINGS

FIG. 15 is a schematic view showing an example of the write mode of a defect management list in a case of using the replacement method of the second embodiment.

DETAILED DESCRIPTION OF THE PREFERRED EMBODIMENTS

Figure 1:
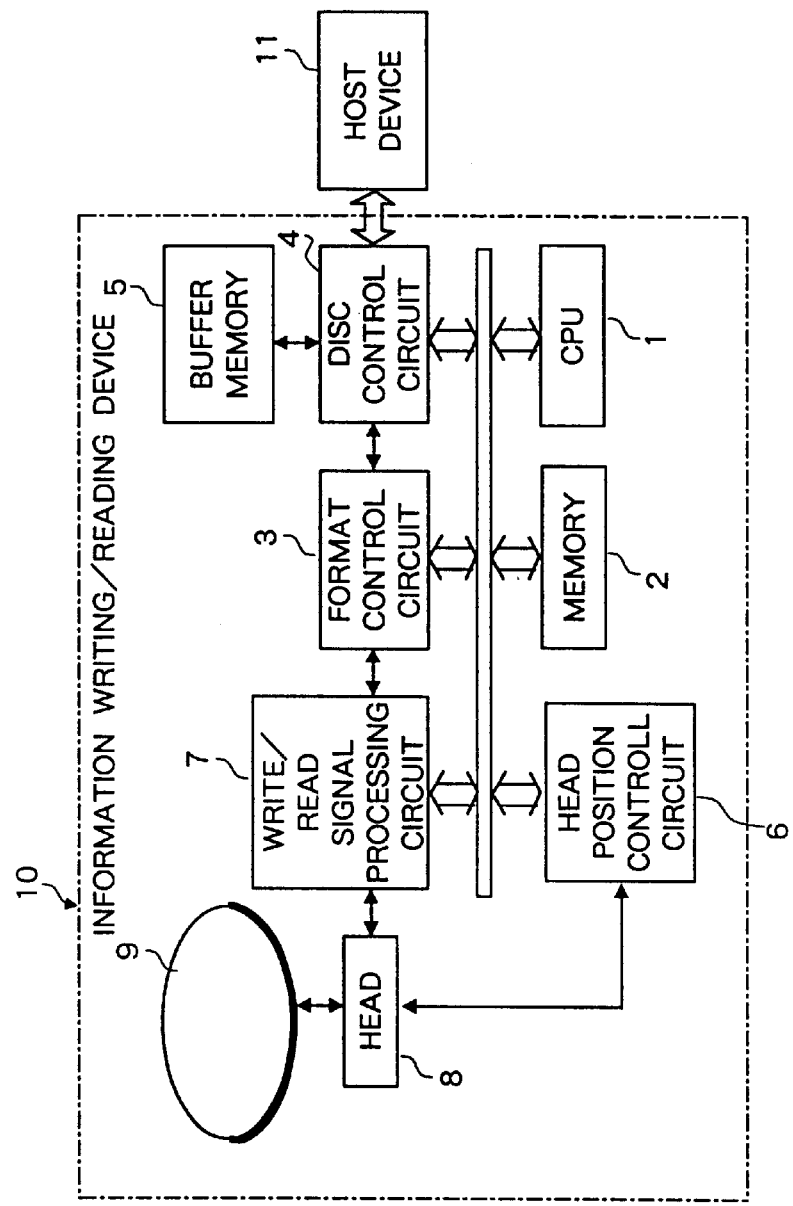
FIG. 1 is a block diagram showing the configuration of an information writing/reading device of the prior art.
Figure 2:
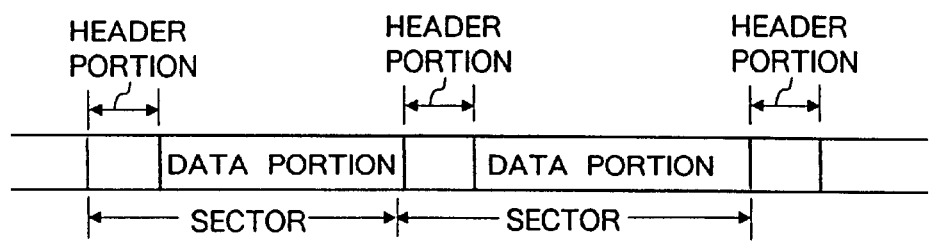
FIG. 2 is a schematic view showing one example of the track structure of a recording medium.
Figure 3:
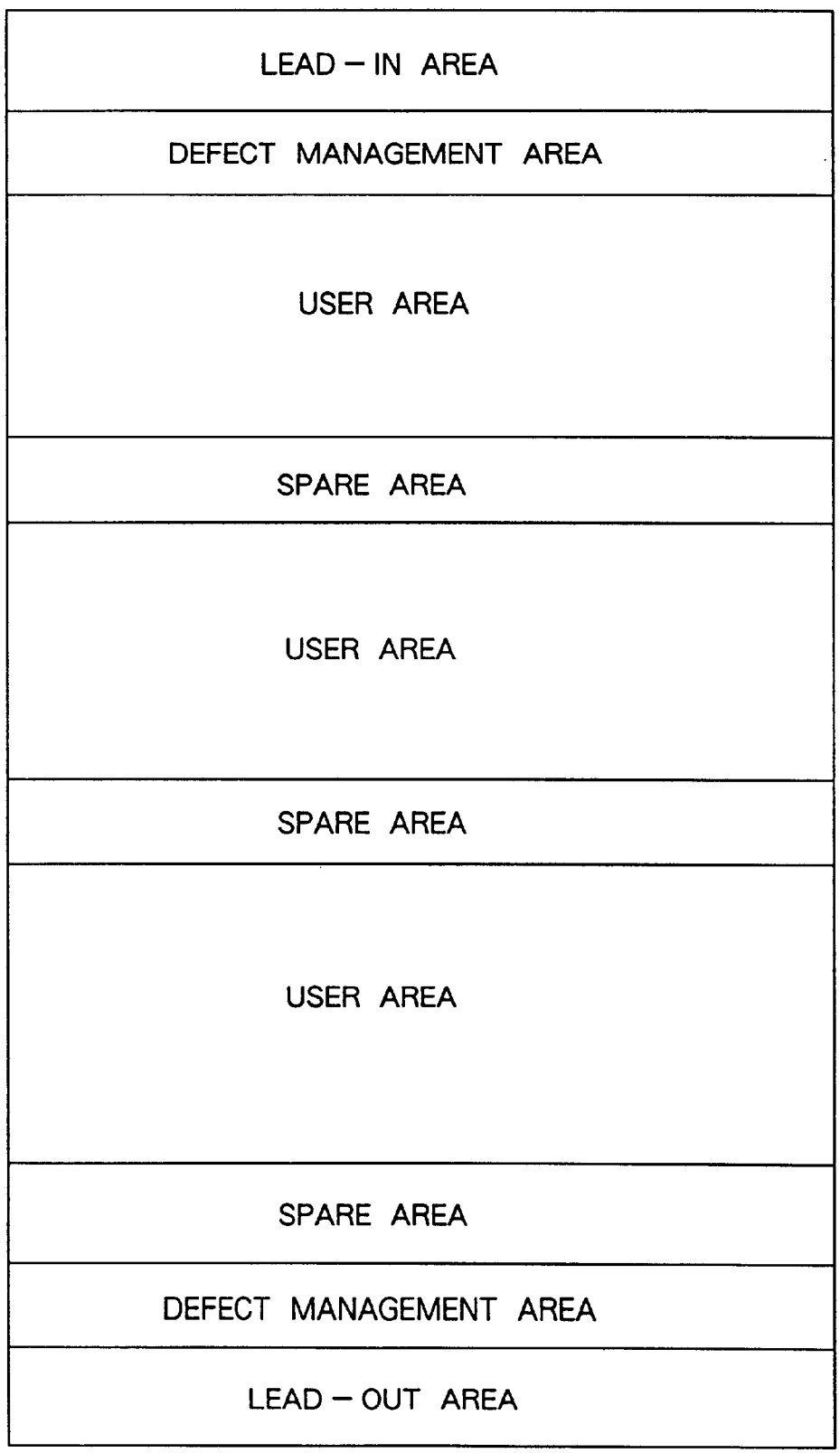
FIG. 3 is a schematic view showing an example of the format of a recording medium.
Figure 4:
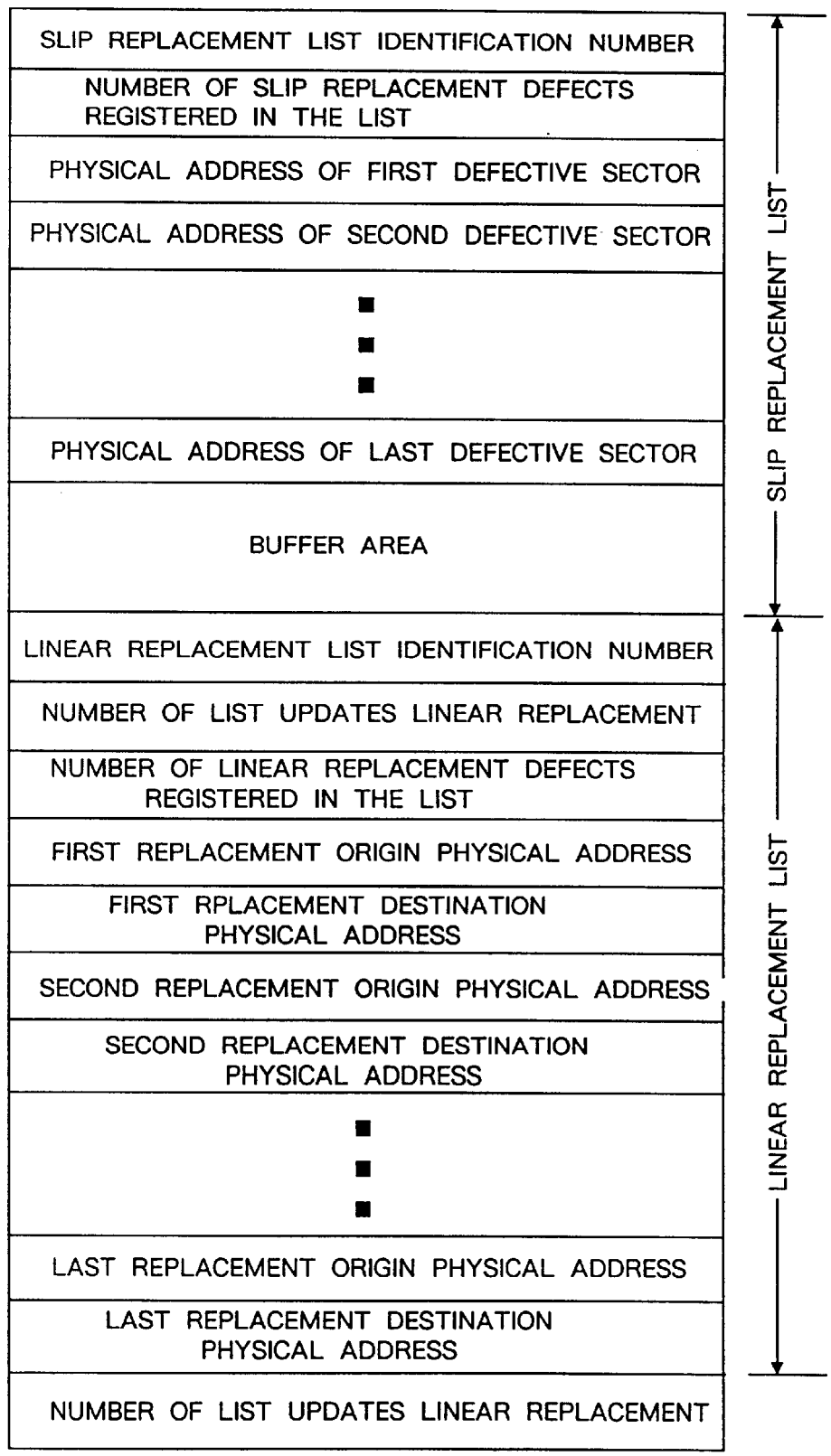
FIG. 4 is a schematic view showing an example of the mode of writing a defect management list.
Figure 8:
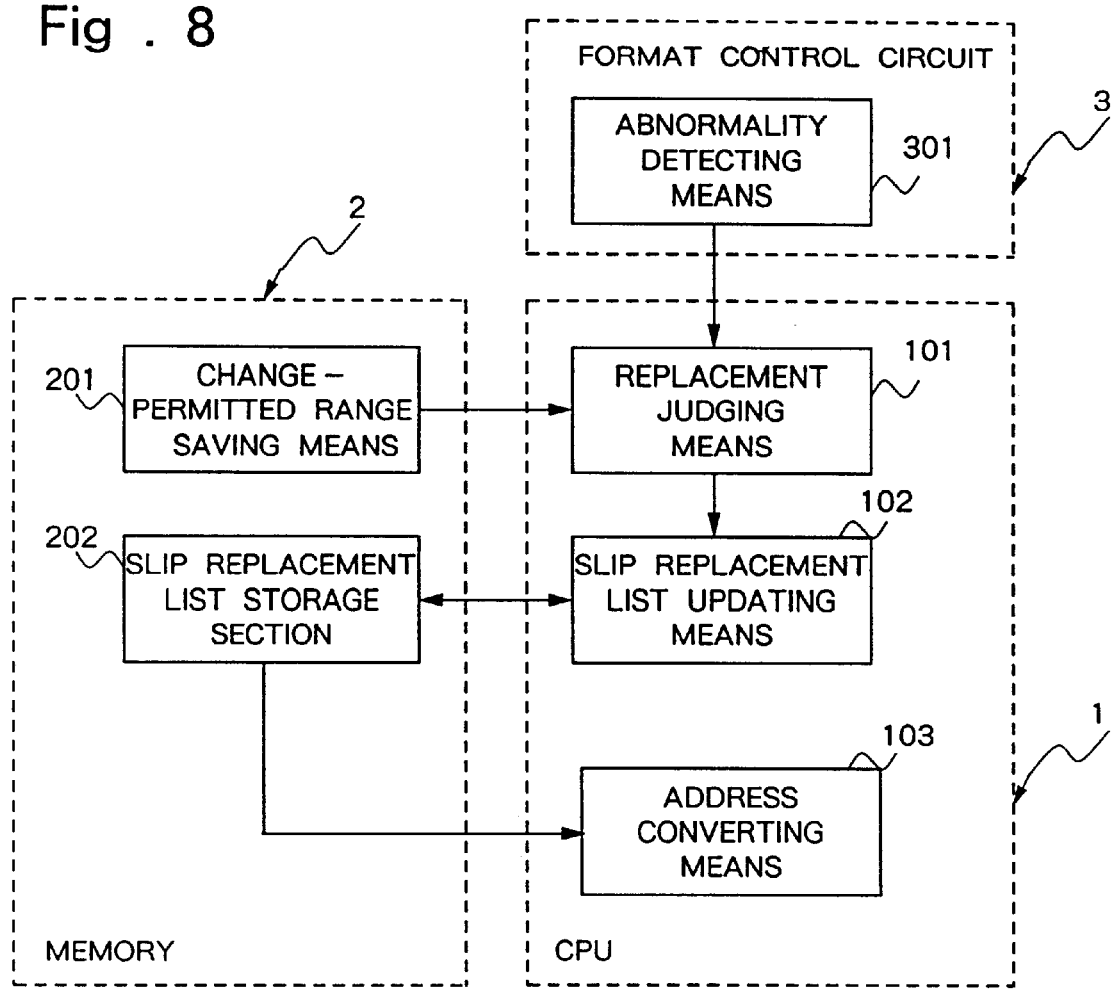
FIG. 8 is a block diagram showing in particular the functions relating to the replacement process that have been extracted from the information writing/reading device according to the first embodiment of the present invention.

The embodiments of the present invention are next explained with reference to the accompanying figures. FIG. 8 is a block diagram showing in particular the composition of functions relating to the replacement and address conversion processing extracted from the information writing/reading device of the first embodiment of the present invention. The overall composition of the information writing/reading device is the same as that of the information writing/reading device of the prior art, and explanation is therefore presented with reference to FIG. 1.

Figure 5:
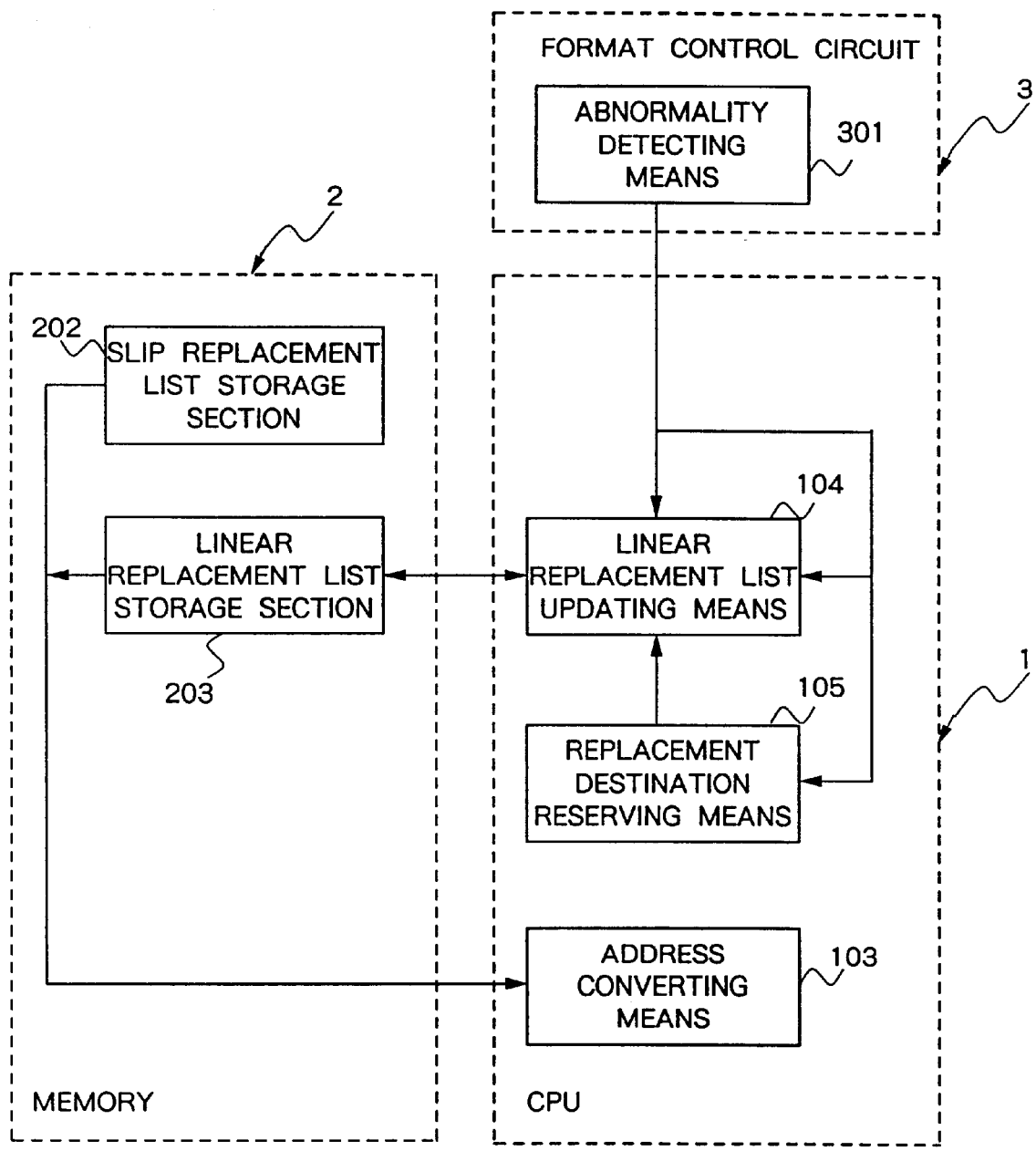
FIG. 5 is a block diagram showing in particular the functions relating to the replacement process and address conversion process that have been extracted from the functions of the CPU, memory, and format control circuit in a writing/reading device of the prior art.
Figure 6:
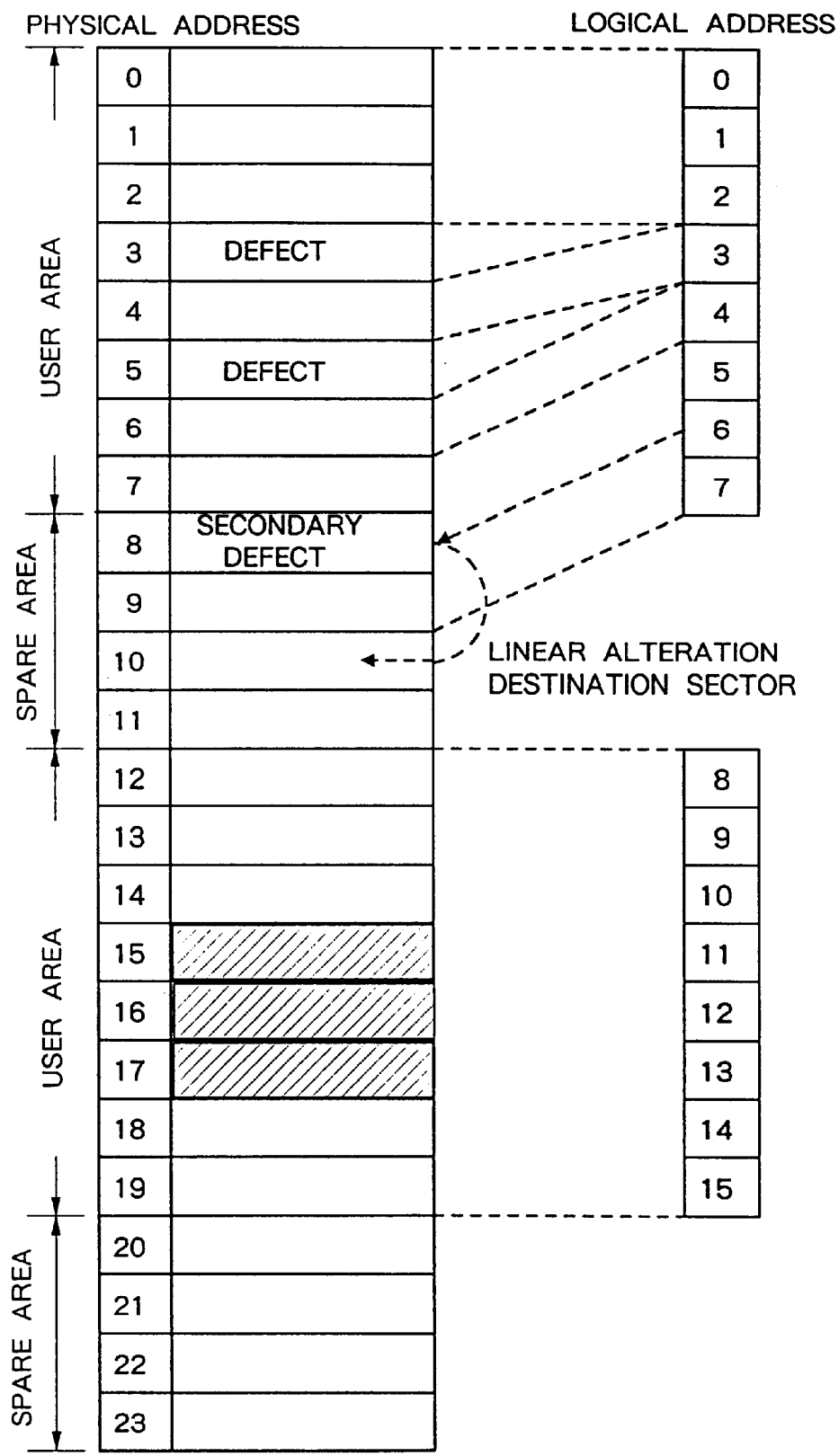
FIG. 6 is a schematic view showing the assignment of replacement sectors for describing the replacement method of the prior art.
Figure 7:
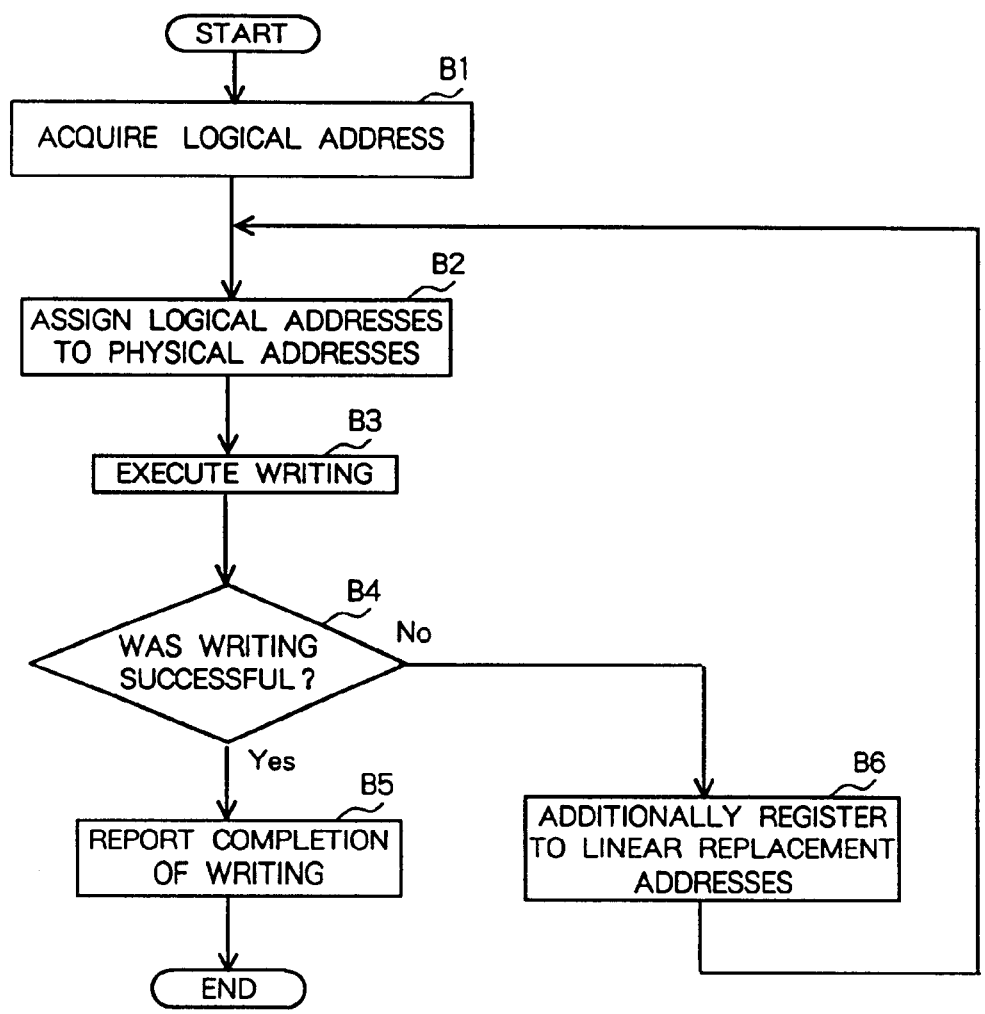
FIG. 7 is a flow chart showing the write procedures according to the replacement method of the prior art.

When writing data onto the recording medium in the first embodiment of the present invention, the physical address of writing data that is assigned to the logical address is calculated by address converting means 103 of CPU 1 while referring to the defective sectors registered in slip replacement list storage section 202 provided in memory 2. As can be seen from FIG. 5, the replacement information to which address converting means 103 referred was divided between and held at both slip replacement list storage section 202 and linear replacement list storage section 203 in the prior-art example. This embodiment, however, has only slip replacement list storage section 202, and address converting means 103 assigns a logical address to the physical address while omitting the defective sectors registered in slip replacement list storage section 202. The present embodiment is similar to the prior art in that subsequent logical addresses are shifted back and assigned if there are defective sectors, and in that logical addresses at the end of one user area are shifted by exactly the number of defective sectors present in that user area and free sectors in the spare area that follows that user area are used.

During writing in this embodiment, as in the example of the prior art, format control circuit 3 receives address signals read from recording medium 9 by way of write/read signal processing circuit 7 and determines the write locations. In this case, if the physical address to which data are to be written cannot be detected, abnormality detecting means 301 that is provided in format control circuit 3 detects the abnormality and reports the detection of a failure to CPU 1. Alternatively, the detection of an abnormality in writing is detected by carrying out a data read verification after the data have been written to the sector in question.

When an abnormality in writing has been detected, replacement judging means 101 provided in CPU 1 determines whether the newly occurring defective sector can be additionally registered in the slip replacement list by the following procedure.

Figure 10:
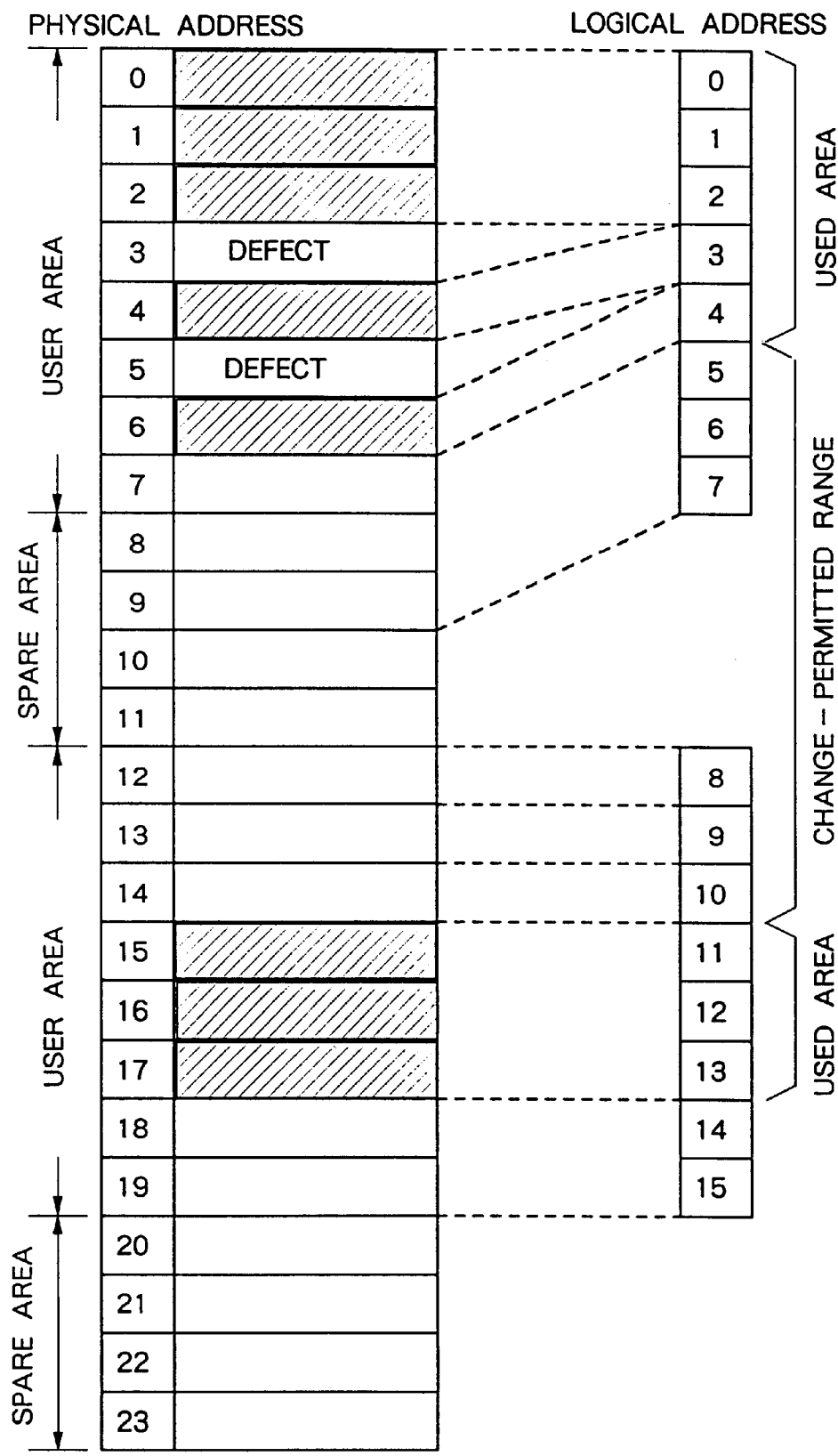
FIG. 10 is a schematic view showing an example of the arrangement of areas for explaining the replacement method of the first embodiment.

Prior to writing to a sector, host device 11 reports the logical address at the end of a change-permitted range to information writing/reading device 10. This change-permitted range is the range of logical addresses from the used area to the next used area, as shown in FIG. 10, and includes sectors to which data have not been written or sectors in which data that have been written have been deleted or discarded. Since data that are to be saved are not included in sectors of the change-permitted range, the assignment and alteration of logical sectors is permitted. The logical address of the end of the change-permitted range reported from host device 11 is saved in change-permitted range saving means 201 in memory 2. When a data string is written in ascending order to physical addresses that have been placed in correspondence with logical addresses, the used area extends as far as the logical address immediately preceding the logical address that is to be written to next. If a write abnormality is detected during writing, changes in the assignment of logical addresses are permitted in the range that follows the sector in which the write abnormality occurred and extends as far as the sector at the end of the change-permitted range that includes the logical address that is saved in change-premitted range saving means 201 in memory 2. In FIG. 10, for example, supposing a case in which data that are assigned to logical address "4" are about to be written to physical address "6" and an abnormality is detected at physical address "6", the logical address of the end of the change-permitted range that is saved in change-premitted range saving means 201 is "10" and the change-premitted range extends to physical address "14", and as a result, physical address "6" that has become defective is skipped and logical addresses from "4" to "10" are assigned to the range from physical address "7" to physical address "14".

Replacement judging means 101 determines that additional registration to the slip replacement list is possible if there is space in a spare sector in this range. The additional registration of a secondary defect sector has no influence on the assignment of logical addresses to physical addresses in areas outside the change-permitted range.

If it is determined in replacement judging means 101 that additional registration to the slip replacement list is possible, slip replacement list updating means 102 adds the registration of the physical address of the defective sector to slip replacement list storage section 202. The write process following the logical address for which a write abnormality was detected in the sector to be written proceeds after address converting means 103 calculates a physical address based on the updated information of slip replacement list storage section 202.

Figure 9:
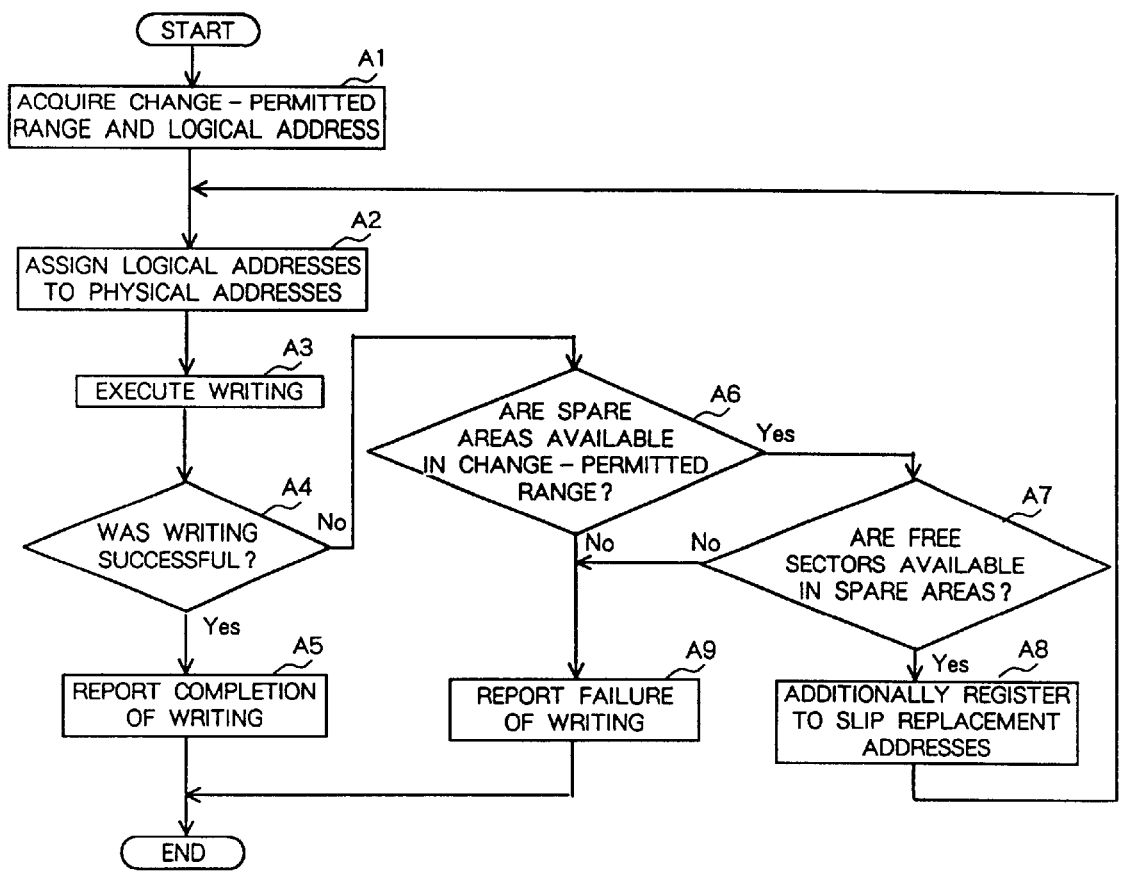
FIG. 9 is a flow chart showing the write procedure according to the replacement method of the first embodiment.

FIG. 9 is a flow chart showing the replacement procedure according to the first embodiment. In this case, explanation is presented regarding the first embodiment in which only slip replacement is used as the replacement process and linear replacement is not used.

First, prior to notification from host device of the logical address to which writing is to be carried out, the logical address of the end of the change-permitted range is reported (Step A1). In the host device, this is the notification of the logical address immediately preceding the sector in which the next data to be saved is to be written, following the logical address for which writing is to be carried out.

Sectors corresponding to the range that extends from the starting address of the logical addresses, for which a write request was output from the host device, to the logical address of the end of the change-permitted range, is the change-permitted range in which changes in the assignment of logical addresses is permitted. In this range there is no guarantee that previously written data will be saved.

When the data to be written that are assigned to the logical addresses are written to physical addresses in an ascending order, the sector in which writing is completed becomes the used area. The starting address of the change-permitted range therefore is updated with writing and always matches the newest logical address that is next to be written to.

Referring now to the slip replacement list, the physical addresses of the write destination of logical addresses that are to be written are next calculated (Step A2); and writing is executed to the calculated physical addresses (Step A3). It is next verified whether or not the write process was successful (Step A4). If writing was successful, the host device is notified that writing is completed (Step A5) and the series of write operations ends.

If, on the other hand, a physical address could not be detected during the write operation, the write process is not carried out and a writing abnormality is determined. In addition, a writing abnormality is also determined if data are read from the written physical addresses and an error occurs in the read data. If a writing abnormality is detected, the replacement process is carried out for the sector in which the writing abnormality occurred. First, it is confirmed whether or not the logical addresses to be written and the logical address of the end of the change-permitted range are included in the same user area (Step A6). If the two are not included in the same user area and straddle a spare area, it is next investigated whether or not a free sector is included in the first spare area following the physical address to which data are written (Step A7). If a free sector is included, the defect can be avoided by slip replacement. The physical address of the sector in which the writing abnormality occurred is additionally registered in the slip replacement list that expands in memory (Step A8), and the writing operations continue by starting again from the calculation of the physical address for writing data (Step A2).

If the logical addresses of data to be written and the logical address of the end of the change-permitted area are included in the same user area and there is no spare area in the change-permitted area, or if there are no free sectors in a spare area, slip replacement is not carried out and the host device is notified of the write defect (Step A9), whereupon the writing operation ends.

Figure 11:
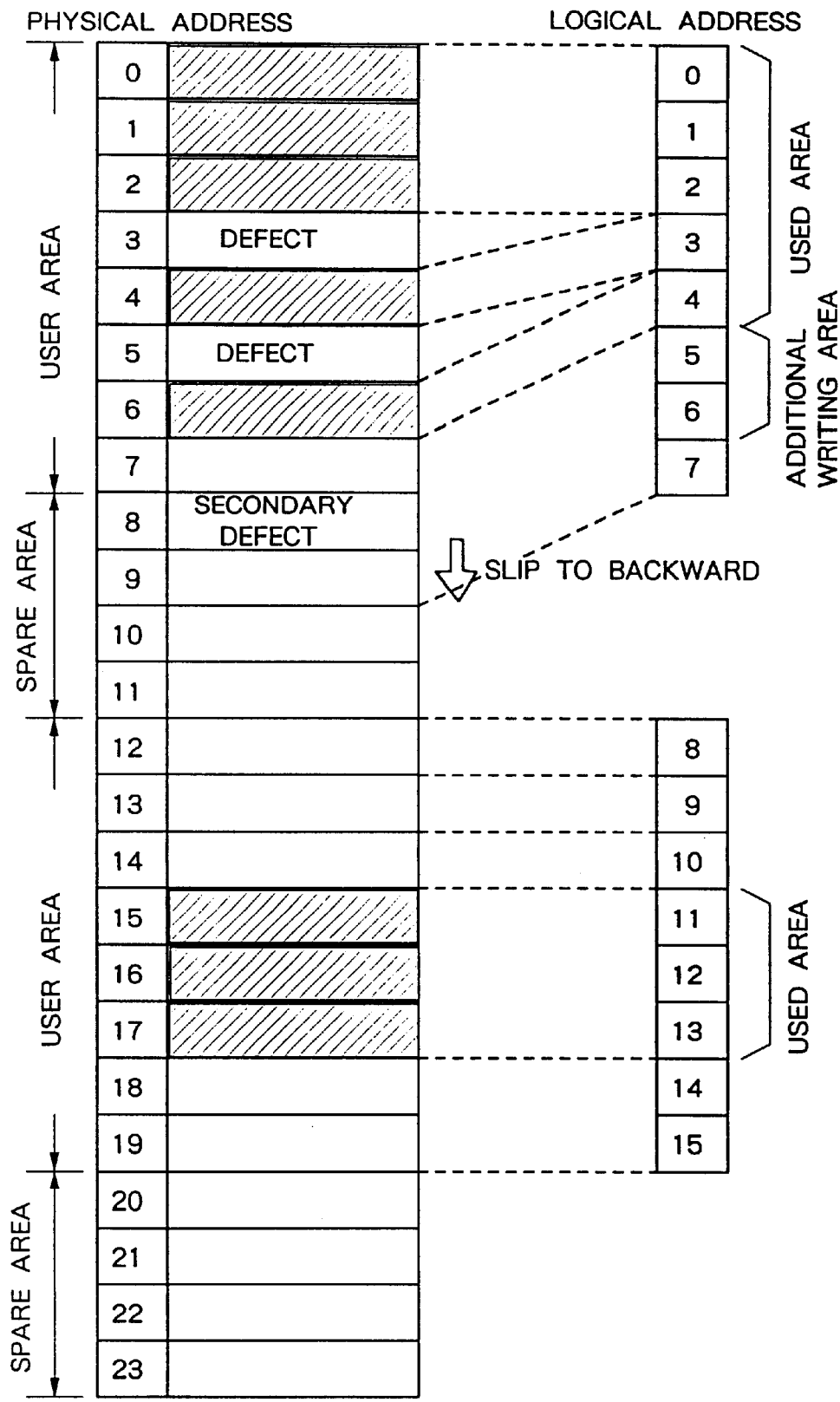
FIG. 11 is a schematic view showing the assignment of replacement sectors according to the replacement method of the first embodiment.

The procedure according to the replacement method of this embodiment is next explained taking an arrangement of defective sectors or areas as an example. FIG. 10 shows an example of the arrangement of areas for explaining the replacement method of this embodiment, and FIG. 11 shows the assignment of replacement sectors according to the replacement method of this embodiment.

As shown in FIG. 10, in a case in which physical addresses from "0" to "7" and from "12" to "19" are user areas, logical addresses in the same number as the 16 sectors of the user areas are assigned in an ascending order. In a case in which physical addresses "3" and "5" are currently registered in the slip replacement list, logical addresses cannot be assigned to physical addresses "3" and "5", and logical address "3" is therefore assigned to physical address "4" and logical addresses from "4" to "7" are made to correspond to physical addresses from "6" to "9".

The host device can discern which logical addresses are being used by reading the data of logical addresses "0" to "2". Normally, the logical addresses in use are managed by the file system of the host device using the several sectors following logical address "0". In this case, the explanation will proceed with the sectors in the range from logical address "0" to "4" and from "11" to "13" as the areas already in use by the host device.

In FIG. 10, in a case in which data from the host device is to be written to sectors corresponding to logical addresses "5" and "6", the logical address "10" at the end of the change-permitted range and logical addresses "5" and "6" for which data are to be written, are first acquired from the host device. The range from logical address "5" to "10" thus becomes the change-premitted range, and changes in the assignment of logical addresses are permitted. Since physical addresses "3" and "5" are registered in slip replacement list, the sector corresponding to logical address "5" shifts two sectors back to physical address "7", and the sector corresponding to logical address "6" becomes physical address "8".

If a write abnormality is detected at physical address "8" as the result of writing to physical addresses "7" and "8", it is next verified whether or not an addition can be made to the slip replacement list. In this case, a spare area exists between the physical address "14" that corresponds to logical address "10," which was reported as the end of the change-permitted range, and physical address "8", which is the intended write destination of logical address "6" that is to be written, and free sectors are left. As a result, the physical address "8" in which the write abnormality occurred is newly registered in the slip replacement list as a slip replacement address. Next, after re-calculating a physical address, physical address "9" is made to correspond to logical address "6", for which writing is not completed, by additionally registering physical address "8" as a defective sector as shown in FIG. 11. Writing is carried out to physical address "9", and if there is no abnormality, the completion of writing to logical addresses "5" and "6" is reported to the host device, and the series of data writing operations ends.

Here, an example was described in which writing is carried out from the host device to still unused areas, but the replacement method of the present embodiment obviously can be used in a case in which an area in use is overwritten. For example, in a case of overwriting logical addresses "3" and "4", which are the areas in use, in FIG. 10, logical address "10" is given as the sector at the end of the change-permitted area, as in the previous case. In a case in which a write abnormality occurs in either or both of the physical addresses "4" and "6" that correspond to logical addresses "3" and "4", the slip replacement process can be realized similarly by adding the abnormal sectors to the slip replacement list as a defective sector.

In a case in which the added writing is to logical addresses "8" and "9", however, slip replacement cannot be carried out even if a write abnormality should occur in a write destination sector.

The logical address at the end of the change-premitted range is logical address "10", which corresponds to physical address "14" and the sector preceding the immediately following used area, and there are no spare areas in this range. If the sector in which a write abnormality occurs is now registered in the slip replacement list, the physical addresses corresponding to logical address "11" and succeeding addresses, which are areas already in use, will shift.

Referring to the flow chart shown in FIG. 9, this type of occurrence is prevented by abandoning replacement if it is determined that no spare areas exist that allow a slip despite the occurrence of a write abnormality, notifying the host device of a write defect, and ending data writing operations. The notification to the host device of the sector in which the write abnormality occurred is used in a check of defective sectors by the host device.

Figure 12:
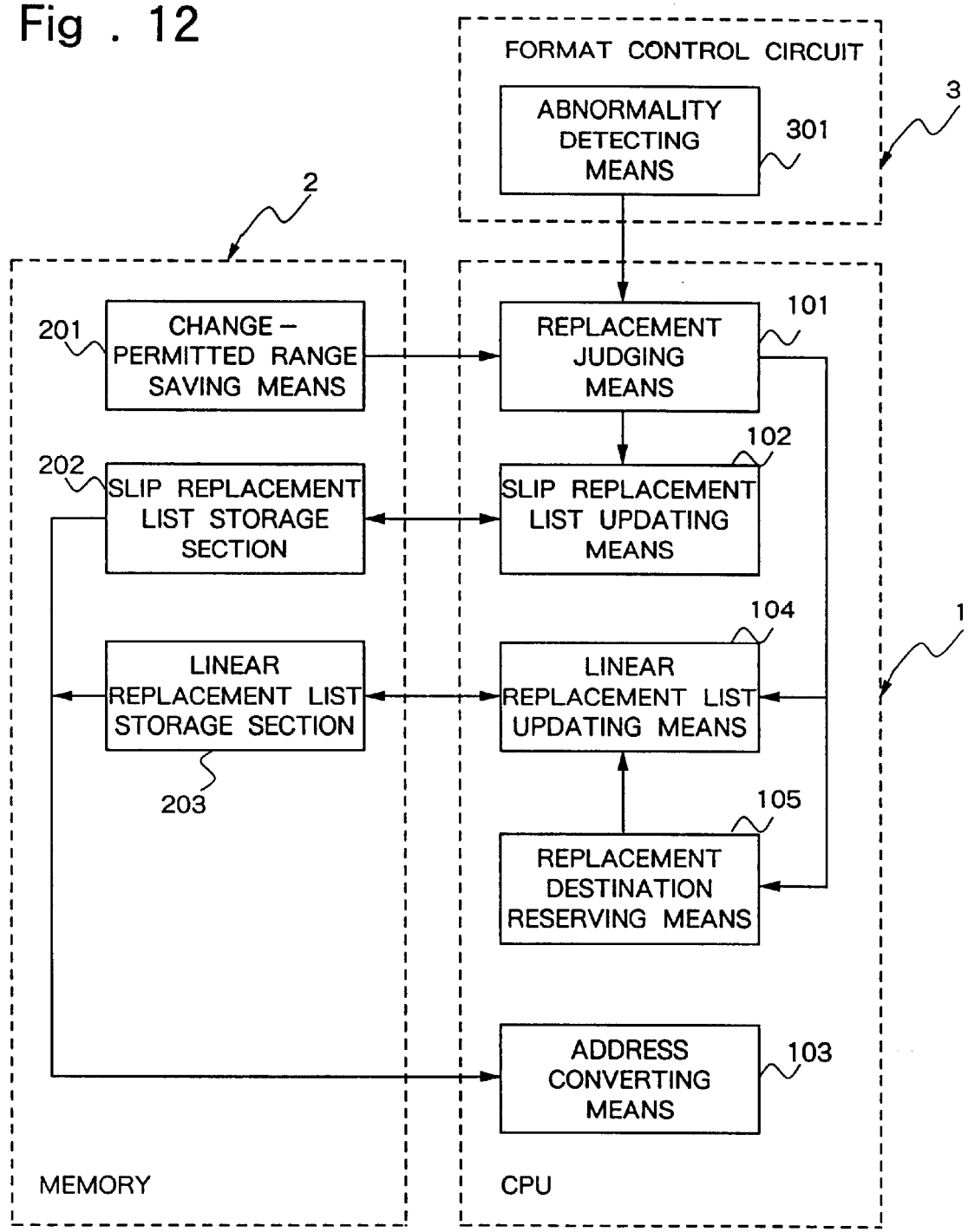
FIG. 12 is a block diagram showing in particular the functions relating to the replacement process of the information writing/reading device according to the second embodiment of the present invention.

The second embodiment of the present invention is next explained with reference to the accompanying figures. FIG. 12 shows the construction of functions relating to replacement of the information writing/reading device according to the second embodiment of the present invention, with particular attention to the combination of slip replacement and linear replacement.

Address converting means 103 is the same as explained in the prior-art example, and refers to the defective sector information of slip replacement list storage section 202 and linear replacement list storage section 203 and assigns logical addresses to physical addresses.

Also, as in the first embodiment shown in FIG. 8, if replacement judging means 101 determines that additional registration can be made to the slip replacement list for a defective sector, the defective sector is additionally registered to slip replacement list storage section 202 by slip replacement list updating means 102.

If replacement judging means 101 determines that additional registration to the slip replacement list is not possible, replacement destination reserving means 105 reserves free sectors, and linear replacement list updating means 104 additionally registers the physical addresses of the replacement origin sector and replacement destination sector to linear replacement list storage section 203. A replacement destination is therefore reserved even when slip replacement is not possible, and write defects caused by insufficient write areas can be avoided.

Figure 13:
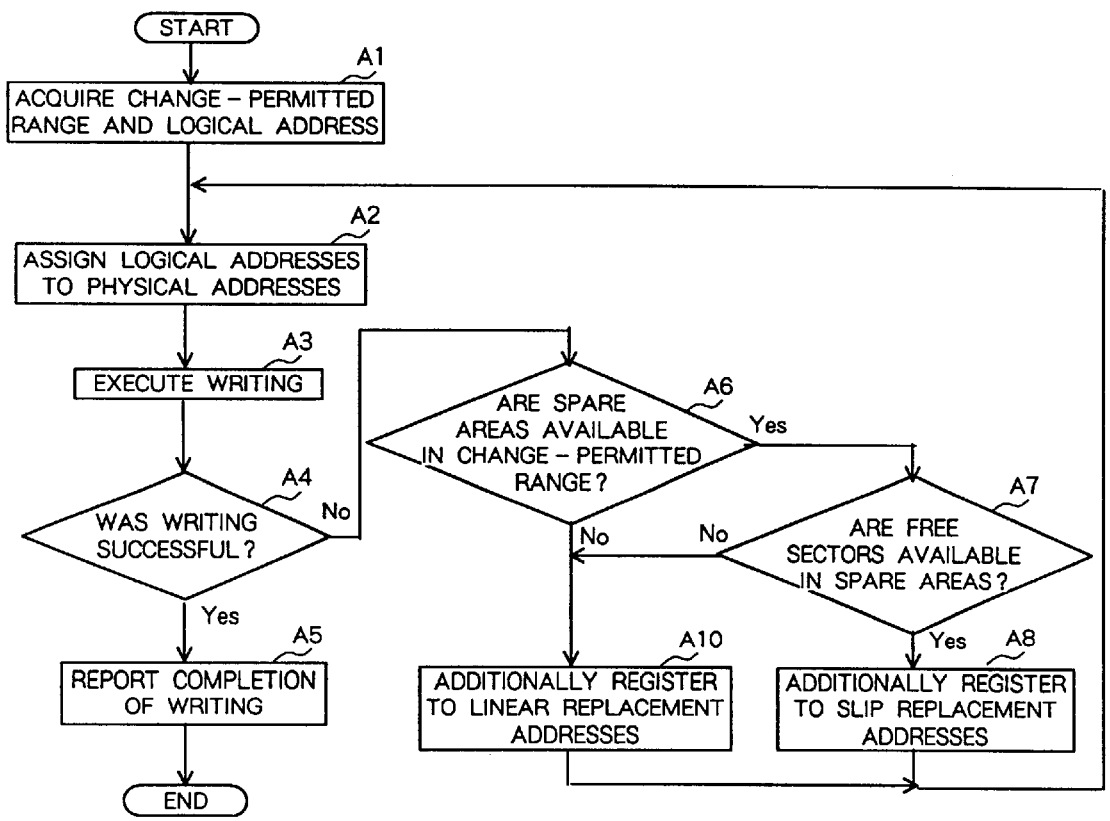
FIG. 13 is a flow chart showing the write procedure according to the replacement method of the second embodiment.

FIG. 13 is a flow chart showing the procedure for a case in which slip replacement and linear replacement are combined. Upon the occurrence of a write abnormality, the change-permitted range is checked (Step A6), and if the change-permitted range does not contain a spare area, or if the result of checking inside spare areas (Step A7) shows that no free sectors are present, linear replacement registration is carried out instead of slip replacement registration (Step A10). In linear replacement, the physical address of the sector in which the write abnormality occurred is registered as the replacement origin address, and the physical address of the replacement destination sector is also registered. As the replacement destination sector, any free sector may be assigned, both from the spare area immediately following the sector that is subject to data writing and from any spare area provided on the recording medium. The execution of linear replacement may result in an increase in secondary processing time that is entailed by the time for head movement, but replacement can be achieved as long as a free sector remains in any spare area.

The assignment of logical addresses in the processing that combines linear replacement is next explained based on the arrangement of areas shown in FIG. 10.

In FIG. 10, in a case in which data are to be newly written to the sectors that correspond to logical addresses "5" and "6", spare areas exist in the change-premitted range, as explained with regard to FIG. 11. Accordingly, even if a write abnormality should occur, replacement can be carried out by adding the physical address of the abnormal sector to the slip replacement list, as in a case using only slip replacement.

Figure 14:
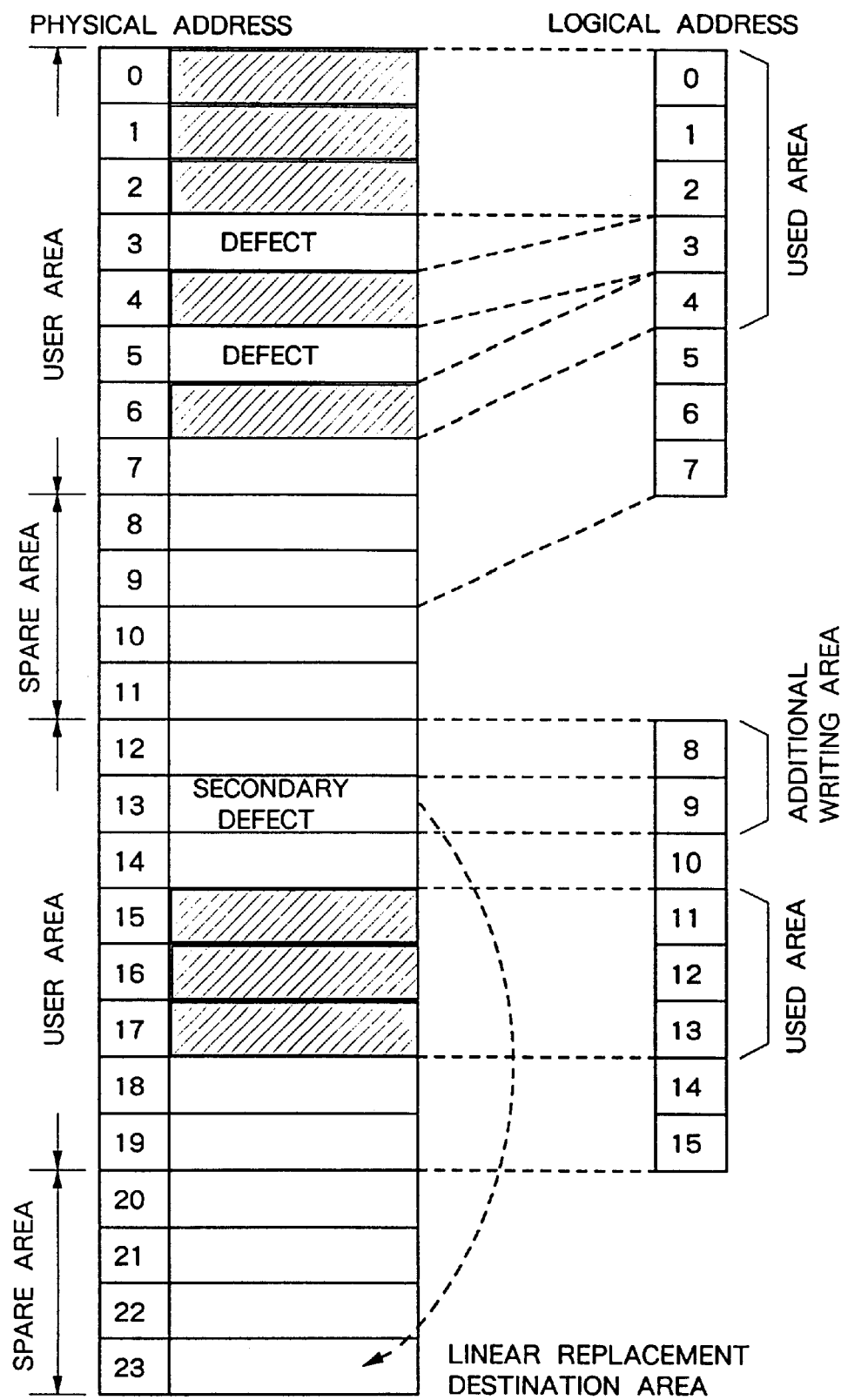
FIG. 14 is a schematic view showing the assignment of replacement sectors according to the replacement method of the second embodiment.

When writing new data to the sectors that correspond to logical addresses "8" and "9", however, no spare areas exist as far as the sector that corresponded to logical address "10", which was reported from the host device as the end of the change-permitted range. As shown in FIG. 14, if a write abnormality should occur at physical address "13", physical address "13" is registered not in the slip replacement list but in the linear replacement list as a replacement origin.

Any free sector from any spare area can be assigned as the replacement destination sector, but a sector in a spare area before or after the replacement origin is better, and in this case, assignment in a descending order from the back of the spare area is preferable. Assignment from the rear allows the effective use of sectors in the front of the spare area for slip replacement. In FIG. 14, physical address "23", which is at the back end of the spare area composed of physical addresses "20" to "23", is assigned as the replacement destination address. Physical addresses "20" to "22", which constitute the free sectors before physical address "23" of the replacement destination, are additionally registered to, for example, logical address "15" and can be used if the necessity for slip replacement should arise.

Even if physical address "11" is made the replacement destination for linear replacement of physical address "13", physical addresses "8" to "10" can be used for slip replacement, and an effect similar to the above-described case can be obtained. In determining which end of a spare area is to be the replacement destination, consideration is given to such time factors as the amount of head movement for reading and writing or the change in the number of disk rotations. It is preferable to decide on an area that shortens processing time.

In this example, a case is described in which linear replacement is executed in sector units, but the procedure is equivalent for a case in which linear replacement is executed with a plurality of sectors having a logical arrangement as the unit. For example, in a case in which parity data are added for error correction in units of 16 sectors of logical addresses, a separated disposition of physical addresses that correspond to each of these 16 sectors would result in complex processing if the necessity should arise to read all of the data of the separated physical addresses for error correction. In such a case, whereas physical addresses are registered in sector units in slip replacement, physical addresses are registered together in 16-sector portions in linear replacement, thereby avoiding the dispersion of the physical addresses.

Spare areas are typically reserved at the ends of zones that are partitioned according to the number of sectors contained in a single disk rotation, and have an area of about 0.5% of a zone. However, spare areas need not be reserved at the ends of zones, and a distributed arrangement may be adopted in which zones are further divided into a plurality of areas and a spare area is reserved at the end of each of these areas. An alternative method would be to reserve user areas together across a plurality of zones and then to reserve a spare area only at the end of this area.

Even though used areas are dispersed when the arrangement of spare areas is distributed, this form increases the probability of spare sectors being included in a change-permitted range and therefore increases the possibility of using slip replacement when write defects occur. On the other hand, this form also decreases the number of sectors in spare areas that can be reserved together, and the occurrence of localized defects on the recording medium may therefore necessitate linear replacement due to the resulting insufficiency of spare areas.

Reserving user areas together across a plurality of zones has the advantage of enabling slip replacement when a large number of localized defects occur, but the probability that slip replacement can be used drops if the used areas become narrower. The use of the device governs whether it is appropriate to increase or decrease the number of continuous sectors in user areas.

The ability to determine whether or not spare areas are included in a change-permitted range notified by the host device is the key point. To this end, the address reported as the address of the end of a change-permitted range need not indicate the address immediately preceding the used area that follows the logical address subject to data writing. For example, spare areas will necessarily be included in the change-permitted range if the change-premitted range extends over a range that is wider than the spacing of spare areas. In such a case, the address of the end of the change-permitted range may be substituted by any logical address that comes a number of sectors after the logical address that is subject to data writing that is greater than the number of sectors of the user area. The result of slip replacement or linear replacement in such a case is equivalent to a case of using an address that immediately precedes a used area that follows the logical address for which data are written.

Although examples were described in the embodiments of this invention in which the acquisition of a change-premitted range was from the host device together with the acquisition of the logical address for which data are written, the logical address of the end of the change-premitted range need not be acquired for each instance of writing. Continuous writing to continuous areas is common, particularly when writing data such as for a moving image. In such a case, the end of a change-premitted range may be reported before acquiring a series of addresses for data writing. The change-permitted range that is reported from the host device to the disk control circuit is saved by the CPU in the change-permitted range saving means in memory. Processing can then be continued with the same address as the end of the change-permitted range until the next time a change-permitted range is reported.

In cases in which the slip replacement list or linear replacement list is altered as part of the writing process, the update results must be written back to the defect management area on the recording medium when the recording medium is ejected from the device or when the power supply is cut. The replacement lists are preferably written to the defect management areas in a format such as shown in FIG. 15. The occurrence of a write abnormality in the defect management areas prevents management by the slip replacement list or linear replacement list. To ensure reliability, a method is therefore employed in which the same data is written redundantly to a plurality of defect management areas. As shown in FIG. 15, the update results are written back in a format in which the number of times of replacement list updating is added before and after the list so as to enable determination of both which of the plurality of lists is the most recent and whether or not there was an interruption when writing the list back to the recording medium.

The timing of writing the replacement list back to the recording medium need not be limited to the times the recording medium is ejected or the power supply is cut, and may be carried out with each passage of a fixed time following the alteration of the list content. Although the secondary processing time entailed by movement of the head to the defect management area may increase, the danger of losing track of the assignment of logical addresses can be prevented even in such cases as the unexpected loss of the power supply such as during a power failure.

As described hereinabove, when secondary defect sectors caused by write abnormalities are detected according to the present invention, replacement processing is performed by slip replacement as long as changes in the assignment of logical addresses do not go beyond sectors in a change-permitted range. As a result, the load in terms of time for head movement entailed by replacement processing can be reduced, and decreases in writing/reading throughput can be prevented.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method of replacing defective areas in an information writing/reading device, wherein said information writing/reading device:

uses a recording medium of disk form in which areas used in data writing are formed by sectors each partitioned into prescribed length, physical addresses being assigned to said sectors without duplication, and user areas that are made up of a plurality of sectors and spare areas for replacement processing that are made up from a plurality of sectors and that are arranged following said user areas being provided in areas of said recording medium that are used for writing data;

and writes or reads digital data of sectors that are subject to writing or reading having logical addresses designated by a host device to said recording medium using said logical addresses that are consecutively assigned to physical addresses of each sector of said user areas;

said method of replacing defective areas comprising steps of:

acquiring, by said information writing/reading device, from said host device, a change-permitted range that follows sectors subject to writing/reading designated by said host device, wherein said change-permitted range is the range of said logical addresses between a used area and the next used area;

and when an abnormality is detected in a write destination sector during data writing, and if a change-premitted range that follows after said abnormal sector includes a spare area that has free sectors, omitting, by said information writing/reading device, the abnormal sector from logical address assignment, and for the next sector and succeeding sectors after the abnormal sector, replacing the assignment of sectors by shifting back the assignment of logical addresses within a range that contains said free sector.

2. A method of replacing defective areas according to claim 1, wherein:

when an abnormality is detected in a write destination sector when writing data, and no spare areas are included in said change-permitted range that follows after the abnormal sector, or if no free sectors are included in spare areas in said change-permitted range, sectors of spare areas not included in said change-premitted range are assigned as the replacement destinations of said abnormal sectors; and only the assignment of logical addresses to said abnormal sectors are changed to the replacement destination sectors.

3. A method of replacing defective areas according to claim 2 wherein, if no spare areas are included in said change-permitted range or no free sectors are included in spare areas in said change-permitted range, replacement destination sectors that are assigned as the replacement destinations of said abnormal sectors are assigned in order from the back of free sectors of spare areas.

4. An information writing/reading device that:

uses a recording medium of disk form in which areas used in data writing are formed by sectors each partitioned into prescribed length, physical addresses being assigned to said sectors without duplication, and user areas that are made up of a plurality of sectors and spare areas for replacement processing that are made up from a plurality of sectors and that are arranged following said user areas being provided in said areas that are used for writing data;

and writes or reads digital data of sectors that are subject to writing or reading having logical addresses designated by a host device to said recording medium using said logical addresses that are consecutively assigned to physical addresses of each sector of said user areas;

said information writing/reading device comprising:

change-permitted range saving means for making an area between a used area and a next used area within said logical addresses a change-permitted range, and saving the logical address of the end of said change-permitted range following sectors subject to writing/reading that are designated by said host device;

abnormality detecting means for detecting a write abnormality of a sector when writing data;

replacement judging means for determining whether or not a spare area is included in a change-permitted range that follows an abnormal sector in which a write abnormality is detected by said abnormality detecting means, and if a spare area is included, determining whether or not there are free sectors in the spare area;

a slip replacement list storage section for saving physical addresses of abnormal sectors;

slip replacement list updating means for additionally registering the physical address of said abnormal sector in data of said slip replacement list storage section if said replacement judging means determines that there are free sectors; and address converting means for omitting physical addresses that are registered in said slip replacement list storage section, and shifting back logical addresses that follow said abnormal sector by assigning logical addresses in order from the front of user areas.

5. An information writing/reading device according to claim 4, further comprising:

a linear replacement list storage section for saving, instead of said slip replacement list storage section, the physical address of an abnormal sector in which a write abnormality was detected by said abnormality detecting means;

replacement destination reserving means for extracting replacement destination sectors from free sectors outside said change-permitted range when said replacement judging means determines either that there are no spare areas or that there are no free sectors;

linear replacement list updating means for additionally registering the physical addresses of said abnormal sectors and the physical addresses of replacement destination sectors reserved by said replacement destination reserving means in the data of said linear replacement list storage section when said replacement judging means determines either that there are no spare areas or that there are no free sectors; and address converting means for shifting back the logical addresses that follow said abnormal sector by omitting physical addresses that are registered in said slip replacement list storage section and assigning logical addresses in order from the front of user areas, and further, assigning logical addresses by substituting physical addresses registered in said slip replacement list storage section by physical addresses of replacement destinations.

6. An information writing/reading device according to claim 5 wherein said replacement destination reserving means is a means for assigning logical addresses in order from the back of free sectors in said spare area.

* * * * *